United States Patent [19]
Viches

[11] Patent Number: 5,339,702
[45] Date of Patent: Aug. 23, 1994

[54] TEST FIXTURE FOR AIR BEARING MAGNETIC HEAD SUSPENSION ASSEMBLY

[75] Inventor: Ilya Viches, Sunnyvale, Calif.

[73] Assignee: Read-Rite Corporation, Milpitas, Calif.

[21] Appl. No.: 996,615

[22] Filed: Dec. 24, 1992

[51] Int. Cl.$^5$ ............... G01M 19/00; G11B 27/36
[52] U.S. Cl. .................... 73/865.9; 325/212; 360/31
[58] Field of Search ............ 73/865.9, 865.8; 360/31; 324/212

[56] References Cited

U.S. PATENT DOCUMENTS

| | | | |
|---|---|---|---|
| 3,478,262 | 11/1969 | Vigil | 324/212 |
| 4,416,144 | 11/1983 | Chen et al. | 73/865.9 X |
| 4,504,871 | 3/1985 | Berwick et al. | 324/210 X |
| 4,532,802 | 8/1985 | Yeack-Scranton et al. | 324/212 X |
| 4,795,981 | 1/1989 | Ertingshausen et al. | 324/454 |
| 4,902,971 | 2/1990 | Guzik et al. | 324/212 |
| 5,038,265 | 8/1991 | Chen | 73/865.9 |
| 5,254,946 | 10/1993 | Guzik | 324/212 X |
| 5,289,327 | 2/1994 | Suda | 324/212 X |

*Primary Examiner*—Tom Noland
*Attorney, Agent, or Firm*—Nathan N. Kallman

[57] ABSTRACT

A fixture (10) for testing a head/gimbal assembly (11) before installion into a disk file functions to load and unload the assembly onto and from a rotating disk (12). The fixture comprises a mounting block (15) for attaching the fixture to a stationary frame (16) to position the fixture in a predetermined position relative to a rotating disk and to permit adjustment of the fixture to selected vertical positions relative to the disk surface. A platform (25) which carries a head/gimbal clamping device (30) is pivotally attached to the mounting block to move a clamped head/gimbal assembly in an arc in a plane normal to the disk surface during loading and unloading. The clamping device comprises a base (31) having a surface which mates with the surface of the head/gimbal and is clamped by a spring-biased element (32) having tooth-type extensions (37) for clamping the head/gimbal against the mating surface of the base. The spring biased element is mounted for pivotal movement relative to the platform and a thumb lever (33) is provided for the operator to release the clamp to readily replace the assembly. The external loading/unloading force is applied directly to the platform and not the assembly.

7 Claims, 2 Drawing Sheets

TEST FIXTURE FOR AIR BEARING MAGNETIC HEAD SUSPENSION ASSEMBLY

FIELD OF THE INVENTION

This invention relates in general to test fixtures for air bearing type magnetic recording head/gimbal assemblies and in particular to a fixture for loading and unloading a head suspension assembly relative to a rotating disk surface.

DESCRIPTION OF PRIOR ART

Air bearing type magnetic recording transducer assemblies are used extensively in magnetic disk files that are employed to store information for use by information processing systems. These devices are referred to in the art as head/gimbal assemblies which comprise an arm member that is adapted at one end to be attached to an actuator and a head suspension that supports an air bearing slider at the other end. Current technology employs a thin film magnetic transducer which is carried by the slider in a closely spaced noncontact relationship with a recording disk. The slider rides on a film of air next to the disk surface as the disk is rotated at relatively high revolutions per minute (RPM)s. In practice, an actuator is used to position the recording gap of the transducer over one of a large number of concentric recording tracks that have been defined on the disk surface. The specific track is designated by a track address that is supplied to the actuator by a servosystem.

Because the mechanical and electrical interfaces between the rotating disk and the head assembly are relatively delicate, it is important to test each manufactured head assembly with a known standard disk prior to installing the head in a disk file. To a lesser degree, it is also important to test each disk with a known standard head assembly but since the magnetic surface of the disk must be checked for imperfections and also formatted, those operations generally also suffice for establishing the fitness of the mechanical interface.

In most files, the head is loaded onto the disk after the disk has reached its normal operating speed. The head is unloaded from the disk prior to the disk stopping if the drive is turned off. The loading and unloading operations are the most critical in that it is during these periods that the tendency of the head to crash into the disk is the greatest.

Prior art testing fixtures generally have employed the same technical concepts that have been used in the actual files to load and unload the head. This concept involves providing a thin lifting blade under the head suspension and lifting the suspension slightly to raise the head from the disk. Since the lifting blade comes in contact with the suspension there is a possibility that this contact could affect the loading characteristics of the suspension. Also, as disk drives become smaller, the head assemblies also must be reduced in size. Since most drives employ one head assembly per disk surface, with the heads being mounted on suspensions at opposite surfaces of the disk, the distance between the pair of suspensions has become quite small, which complicates the insertion of two lifting blades to perform the loading and unloading operations.

Another problem with existing test fixtures is that the test operator is required to spend considerable time fixedly positioning each head assembly into the test fixture. In one known fixture the operator must attach the head/gimbal assembly to the fixture by screws. A further problem is encountered when the fixture is required to test head assemblies having different design parameters, such as being mounted at a different heights (Z-distance) above the disk. Adjusting the Z-distance of prior art fixtures involves significant time and requires special shims. In addition, most prior art fixtures were designed to test a specific head/gimbal assembly. When a new head/gimbal design was adopted a new test fixture had to be built. The present invention provides an improved fixture for testing head/gimbal assemblies that avoids the above-mentioned problems.

SUMMARY OF INVENTION

An object of the present invention is to provide an improved test fixture for head/gimbal assemblies in which the force for loading/unloading the head from the disk is not applied directly to the head suspension.

Another object of the present invention is to provide a test fixture for head suspension assemblies in which the assembly is easily clamped to the fixture prior to testing by action of an operator.

A further object of the invention is to provide a test fixture in which the device for clamping the head/gimbal assembly to the fixture includes a base member which is replaceable so that differently designed assemblies may be clamped merely by changing the base member.

In accordance with the present invention, a test fixture comprises a mounting block which is attachable to a stationary frame member of the test fixture by means of a Z-axis lead screw disposed normal to the plane of a rotating disk on which the head is to be loaded. The function of the mounting block is to permit control by the operator of vertical movement of a pivotally attached loading platform to which a head/gimbal assembly is clamped and to support the loading platform for a pivoting motion about a horizontal axis disposed at one end of the platform. The other end of the loading platform is provided with a horizontally positioned U-shaped recess into which a head/gimbal assembly clamping device is mounted.

The clamping device functions to rigidly clamp the distal end of the suspension portion of the head/gimbal assembly to the loading platform so that the head is loaded and unloaded as a result of the pivoting motion of the platform. The clamping device includes three major components. The first component is a clamp base which is removably attached to the mounting platform. The clamp base is tailored to the particular head/gimbal assembly in that its bottom horizontal surface is designed to mate with the flat surface of the head suspension. The second component of the clamp is a pivotally mounted jaw element which functions to clamp the distal end of the head suspension against the horizontal mating surface of the clamp base. The jaw element is replaceable to accommodate head/gimbal assemblies with differently designed distal ends.

The third component of the clamping device is the thumb lever which the operator uses to open the clamp prior to inserting a new head/gimbal assembly for test. The thumb lever is a vertically disposed yoke shaped member to which the upper end of the jaw element is attached for pivotal movement about an axis parallel to the pivotal axis of the platform. The jaw element is attached to the platform by a horizontally disposed axle mounted in the platform and therefore pivots about a second axis positioned between the thumb lever and the end of the element which clamps the head/gimbal assembly. The axle is also parallel to the pivotal axis of the platform.

The actual loading and unloading force for the improved fixture is applied to the underside of the platform as contrasted to the prior art arrangement where the force is applied directly to the head/gimbal assembly.

DESCRIPTION OF THE PREFERRED EMBODIMENT

Figure 1:
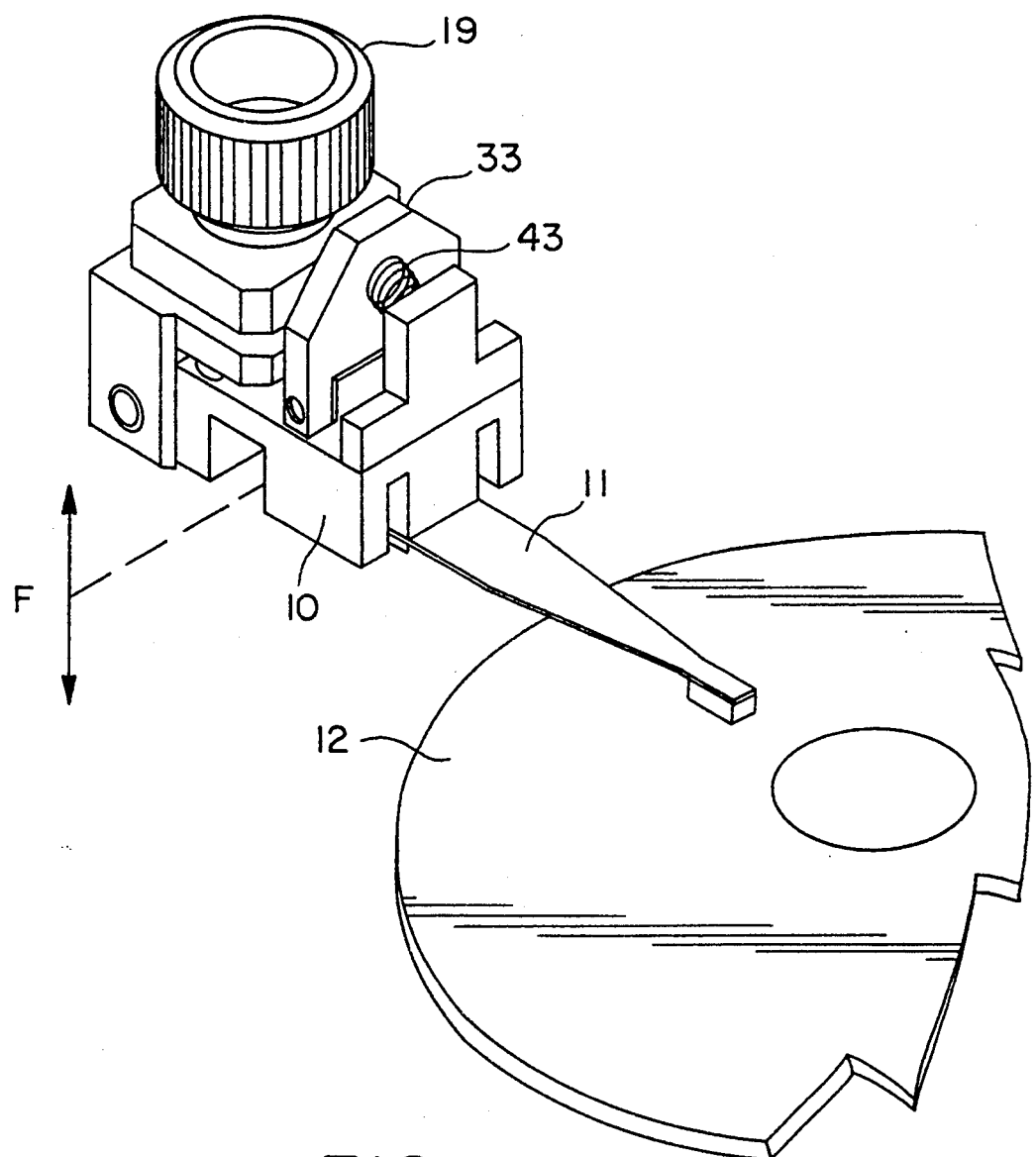
FIG. 1 is a perspective view of the fixture of the present invention illustrating a head/gimbal assembly loaded onto a rotating disk.

FIG. 1 illustrates a test fixture designated generally by reference character 10, for loading a head/gimbal assembly 11, shown diagrammatically in FIG. 1, loaded against a rotating disk 12.

Figure 2:
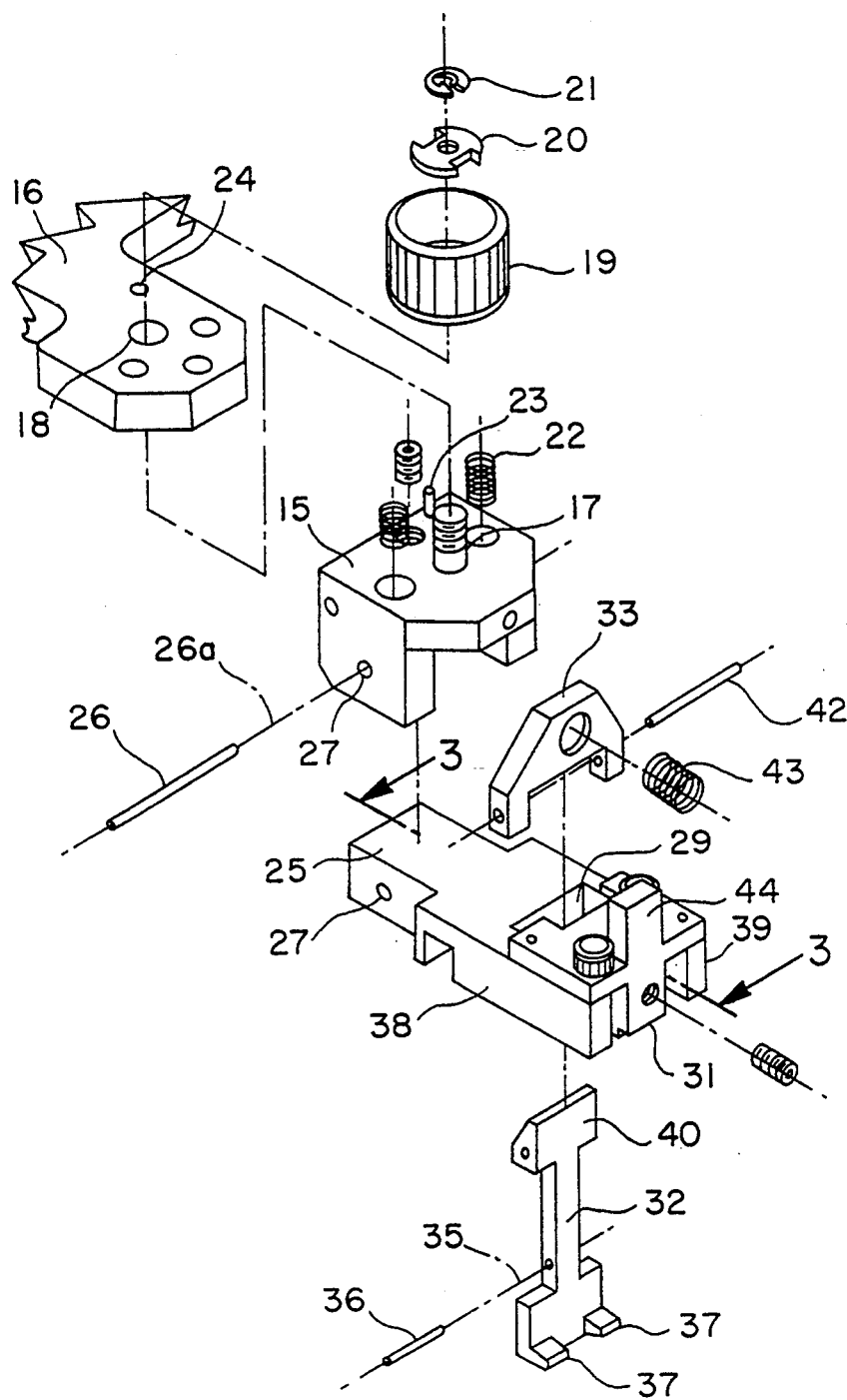
FIG. 2 is an exploded view of the test fixture shown in FIG. 1.

The test fixture 10, as shown in an exploded view in FIG. 2, comprises a mounting block 15, which is mounted under a stationary frame member 16. The mounting block 15 is provided with an guide shaft 17, that extends through an opening 18 in the frame member 16. A guide bushing 19 screws onto the threaded end of the guide shaft 17 and is prevented from being released from the lead screw by a washer 20 and adjusting nut 21. A set of coil springs 22 are sandwiched between the top of block 15 and the bottom of frame member 16. A guide pin 23 disposed normal to the top surface of block 15 keeps the movement of block 15 parallel to the axis of the guide shaft 17.

The fixture further comprises a loading platform 25 which is pivotally attached to the block 15 by means of the shaft 26 which is mounted in the openings 27. The axis 26a of shaft 26 is horizontal and generally 90 degrees to the longitudinal axis of the head/gimbal assembly 11. The other end of the platform is provided with a square U-shaped opening 27 which functions to mount a head/gimbal clamping device designated generally by reference character 30.

Figure 3:
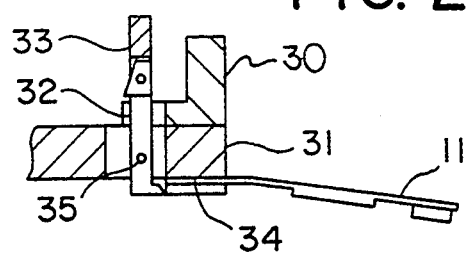
FIG. 3 is a sectional view of the clamping device shown in FIG. 2.

Device 30 as assembled is shown diagrammatically in FIG. 3 and comprises a clamp base 31, a clamp jaw element 32 and a thumb lever 33. The bottom surface 34 of the block 31 is designed to mate with the head/gimbal so that as the top portion of the element 32 is biased to the left the bottom portion is rotated about the axis 35 to the right to clamp the head/gimbal 11. In the preferred embodiment, the jaw element is provided with a pair of teeth 37 for gripping the head/gimbal 11. Pin 36 which defines the pivotal axis 35 is mounted horizontally in sides 38 and 39 defining the U-shaped opening 27 in platform 25.

The thumb lever 33 is pivotally attached to the upper end 40 of the jaw element 32 by the pin 42. As shown in FIG. 2, a spring 43 is disposed between the thumb lever 33 and the upward extension 44 of the block 31 maintains the clamping force on the head/gimbal 11. In effect there are two orthogonal forces applied against the baseplate or block 31 pressing the thumb lever to the left as shown in FIG. 3 releases the clamp and allows the insertion of a new head/gimbal assembly.

In operation, after the head/gimbal assembly is attached to the fixture, a vertical force F as shown in FIG. 1 is applied to the platform 10 to load and unload the head/gimbal 11 relative to the disk 12. Since the force F is not applied directly to the head/gimbal 11 there is no possibility of damaging the assembly as a result of the testing operation. It will also be apparent that attaching the head/gimbal 11 to the fixture by means of the clamping device is considerably more efficient than arrangements suggested by the prior art.

While the invention has been particularly shown and described with relation to a preferred embodiment thereof, it will be apparent to those persons skilled in the art that various changes and modifications may be made therein without departing from the spirit of the invention and the scope of the appended claims.

What is claimed is:

1. A fixture for testing an air bearing type magnetic recording head/gimbal assembly prior to installation into a disk file by loading and unloading said assembly onto and off of a rotating disk, said fixture being mounted in a predetermined spatial relationship to said disk by a frame member and including,
   A) a mounting block for attaching said fixture to said frame including adjusting means to permit said fixture to be moved to selected vertical positions relative to said disk,
   B) a loading platform including a device for clamping a portion of said assembly in a fixed relationship to said platform, and
   C) means for mounting said platform on said mounting block to permit said head to be moved in a plane normal to said disk about a pivotal axis disposed in a plane parallel to said disk surface and wherein said device for clamping includes,
   D) a block attached to said platform and having a bottom surface to provide a mating engagement with a surface on said head/gimbal assembly; and
   E) an element biased to clamp said head/gimbal assembly in mating engagement with said block.

2. The fixture recited in claim 1, in which said block is removably attached to said platform to permit replacement with another block which provides a mating engagement for a head/gimbal assembly of a different design.

3. The fixture recited in claim 2 in which said element includes a pair of tooth extensions and means are provided to mount said element for pivotal movement about an axis parallel to said bottom surface to cause said extensions to move toward said bottom surface to clamp said assembly.

4. The fixture recited in claim 3 in which means are provided to allow an operator to readily pivot said element to release said clamping force to permit said head/gimbal assembly to be removed by said operator and a new assembly inserted in the clamp.

5. The fixture recited in claim 4 in which said adjusting means includes a z-axis lead screw mounted to said block to extend through an opening in said frame, and a rotatable knob engaging said lead screw to cause said block to move vertically up and down in response to said operator rotating said knob.

6. The fixture recited in claim 5 in which a set of springs is disposed between the top surface of said block and said frame to bias said block toward the plane of said disk.

7. The fixture recited in claim 6 in which means are provided to pivot said platform to load and unload said assembly to and from said disk without engaging said assembly.

* * * * *